(12) United States Patent
Mayer

(10) Patent No.: US 10,274,154 B2
(45) Date of Patent: Apr. 30, 2019

(54) LASER UNIT HAVING A COLLIMATOR ADJUSTING DEVICE

(71) Applicant: ZKW GROUP GMBH, Wieselburg (AT)

(72) Inventor: Matthias Mayer, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 15/737,461

(22) PCT Filed: May 27, 2016

(86) PCT No.: PCT/AT2016/050166
§ 371 (c)(1),
(2) Date: Dec. 18, 2017

(87) PCT Pub. No.: WO2016/201464
PCT Pub. Date: Dec. 22, 2016

(65) Prior Publication Data
US 2018/0187856 A1 Jul. 5, 2018

(30) Foreign Application Priority Data
Jun. 19, 2015 (AT) .................. 50517/2015

(51) Int. Cl.
*F21K 9/65* (2016.01)
*F21K 9/69* (2016.01)
(Continued)

(52) U.S. Cl.
CPC .............. *F21S 41/635* (2018.01); *F21K 9/65* (2016.08); *F21K 9/69* (2016.08); *F21S 41/14* (2018.01);
(Continued)

(58) Field of Classification Search
CPC ........ F21S 41/635; F21S 41/67–41/675; F21S 41/63–41/645; F21V 14/06
See application file for complete search history.

(56) References Cited

U.S. PATENT DOCUMENTS 5,113,291 A 5/1992 Naiki
5,381,438 A 1/1995 Guo et al.
(Continued)

FOREIGN PATENT DOCUMENTS

DE 102006020961 A1 11/2007
EP 1234716 A2 * 8/2002 ............. B60Q 1/076
(Continued)

OTHER PUBLICATIONS

Search Report issued in Austrian Application No. A 50517/2015, completed May 11, 2016 (1 page).
(Continued)

*Primary Examiner* — Mariceli Santiago
(74) *Attorney, Agent, or Firm* — Eversheds Sutherland (US) LLP

(57) ABSTRACT

A laser unit (11) for a vehicle headlight has a laser diode (12) that is associated with adjustable collimating optics (13) for the laser light emitted by the laser diode. The collimating optics (13), which comprise at least one optical component, e.g., a lens (14), are arranged at a distance, in a longitudinal direction (x), from the laser diode (12), this distance being adjustable by an adjusting device (20). The adjusting device comprises a carrier (24), which is adjustable in the longitudinal direction relative to the laser diode (12) with the help of longitudinal actuation means (21), and in which the optical component (14) is mounted so that it can pivot transverse to the longitudinal direction (x) in a holder (23).

17 Claims, 3 Drawing Sheets

Figure 1:
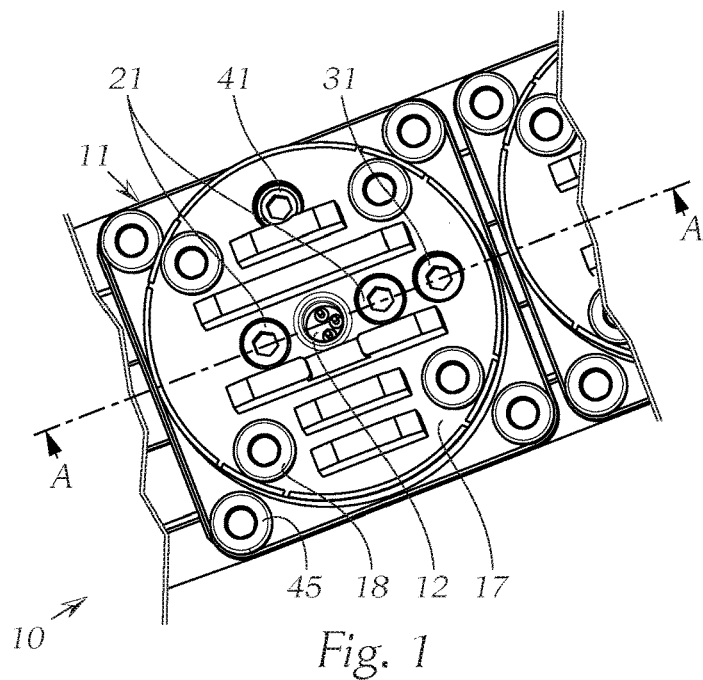

(51) Int. Cl.
*G02B 7/00* (2006.01)
*G02B 7/02* (2006.01)
*H01S 5/00* (2006.01)
*F21S 41/14* (2018.01)
*F21S 41/16* (2018.01)
*F21S 41/19* (2018.01)
*F21S 41/63* (2018.01)
*F21V 15/01* (2006.01)
*G02B 27/09* (2006.01)
*F21Y 101/00* (2016.01)
*F21Y 115/30* (2016.01)

(52) U.S. Cl.
CPC ............. *F21S 41/16* (2018.01); *F21S 41/192* (2018.01); *F21V 15/01* (2013.01); *G02B 7/004* (2013.01); *G02B 7/023* (2013.01); *G02B 27/0916* (2013.01); *F21Y 2101/00* (2013.01); *F21Y 2115/30* (2016.08); *H01S 5/005* (2013.01)

(56) References Cited

U.S. PATENT DOCUMENTS

| | | | | |
|---|---|---|---|---|
| 6,059,428 | A * | 5/2000 | Perlo | F21S 41/635 362/268 |
| 6,198,580 | B1 | 3/2001 | Dallakian | |
| 6,905,069 | B2 | 6/2005 | Claus et al. | |
| 8,939,619 | B2 * | 1/2015 | Shibata | B60Q 1/076 362/460 |
| 9,481,291 | B2 * | 11/2016 | Shibata | B60Q 1/0683 |
| 9,664,353 | B2 * | 5/2017 | Maliar | F21S 48/1721 |
| 2006/0139918 | A1 | 6/2006 | Dolgin et al. | |
| 2015/0323148 | A1 * | 11/2015 | Tsuda | F21S 48/1721 362/510 |
| 2016/0137122 | A1 * | 5/2016 | Oshima | B60Q 1/076 362/512 |
| 2016/0332558 | A1 | 11/2016 | Mayer | |

FOREIGN PATENT DOCUMENTS

| | | |
|---|---|---|
| JP | H11223785 A | 8/1999 |
| JP | 2004341451 A | 12/2004 |
| JP | 2014225411 A | 12/2014 |
| KR | 20020054654 A1 | 7/2002 |
| KR | 1020020054654 A | 7/2002 |

OTHER PUBLICATIONS

International Search Report for PCT/AT2016/050166, dated Sep. 13, 2016 (2 pages).

Notice of Grounds for Rejection JP Patent Application No. 2017-565711.

* cited by examiner

LASER UNIT HAVING A COLLIMATOR ADJUSTING DEVICE

The invention relates to a laser unit for a vehicle headlight comprising: a laser light source, preferably a laser diode, a support housing in which the laser light source is supported, and adjustable collimating optics for laser light emitted by the laser light source, the collimating optics comprising at least one optical component that is arranged at a distance, in a longitudinal direction, from the laser light source.

In the context of this disclosure, optical component means an optical component with light-converging or light-diverging properties, more specifically a shaped reflector (e.g., concave mirror or convex mirror) or an optical lens, and can also include combinations of these components. The longitudinal direction is understood to be the direction of the imaginary axis along which the laser light from the laser light source propagates to the collimating optics.

The use of laser light sources in motor vehicles, especially for motor vehicle headlights, is currently becoming more important, since laser diodes allow more flexible and more efficient solutions, and also allow a substantial increase in the light beam's luminance and the luminous efficiency.

However, the known solutions do not involve the direct emission of a laser beam from the lighting device or the headlight, to prevent the extremely concentrated high-power light beam from endangering the eyes of humans and other living things. Instead, the laser beam is directed at an interposed conversion element that contains a material for luminescence conversion, called "phosphor" for short, and that converts laser light, for example of a wavelength in the blue range, into visible light, preferably white light; this visible light is then directed outward. In the context of this invention, "phosphor" is understood in a very general way to mean a substance or a mixture of substances that converts light of one wavelength into light of another wavelength or of a mixture of wavelengths, in particular, into "white" light, which can also be subsumed under the term "wavelength conversion". For the most part, the conversion element has, upstream of it (with respect to the beam path of the laser light), a mirror that can be swung horizontally in a programmed manner and that can direct the laser beam onto various places on the planar conversion element. To produce well-defined light spots or (if the mirror is moving) light patterns on the conversion element, the light coming from the laser light source is collimated by means of an optical arrangement, which is designated here as collimating optics. As a rule, the collimating optics are arranged directly after the laser light source (with respect to the beam path) and can comprise multiple optical components and/or components limiting the light, however it is frequently formed by a single optical lens.

Due to manufacturing deviations in the relative position and orientation of the components of the collimating optics and the laser light source, but also to allow the possibility of later readjustment, it is necessary to adjust the optical components of the collimating optics relative to the laser light source so that it is possible to produce a light spot with the desired sharpness on the conversion element.

Therefore, it is a goal of the invention to allow exact and simultaneously uncomplicated adjustment of the collimating optics. Here it has been shown to be advantageous to allow adjustment not only of the orientation, but rather also of the distance of the optical component(s) of the collimating optics from the laser light source. Especially in the case of laser modules with multiple laser light sources, individual adjustment of the individual laser beams is necessary.

The invention accomplishes this, starting from a laser unit of the type mentioned at the beginning, by an adjusting device associated with the collimating optics, this adjusting device having a carrier that is adjustable in the longitudinal direction relative to the laser light source, the at least one optical component within the carrier being mounted so that it is pivotable about at least one spatial axis running transverse to the longitudinal direction.

This solution provides simple and reliable adjustability of the collimating optics, both in the longitudinal direction and also transverse to it, which is possible even after the optical system (laser light source, collimating optics, other mirrors, etc.) has been assembled. This allows adjustment of the alignment of the collimating optics with regard to the laser light source, which is extremely important from the perspective of illuminating engineering but is very sensitive to deviations, and also allows correction of misadjustments. Therefore, this makes it possible to avoid assembly cycles, which have often been elaborate up to now. Another advantage is the large adjustment range provided by this technical solution.

A favorable further development of the invention can provide, in the support housing, a longitudinal actuation device that is adjustable in the longitudinal direction, the carrier being supported against the at least one longitudinal actuation means. In one of the possible advantageous embodiments, the longitudinal actuation device can be realized as a number of adjusting screws running parallel to the longitudinal direction. To stop later disadjustment, the longitudinal actuation device can additionally be fixable in its longitudinal position. Moreover, it can be expedient to provide, in the support housing, at least one elastically deformable spring element with which the carrier is pressed against the at least one longitudinal actuation means.

In many embodiments, the design of the laser unit can be simplified by making the carrier adjustable in the longitudinal direction in the support housing, while the laser light source is fixed in position in the support housing.

To allow greater flexibility in the optical adjustment capabilities, it can be favorable if the at least one optical component is mounted so that it can pivot about two spatial axes, the spatial axes that are perpendicular to one another being perpendicular to the longitudinal direction.

An advantageous further development of the invention can implement the swing of the collimating optics by providing, in the carrier, a holder in which the optical element is held, and at least one—preferably two—levers acting upon the holder, an outer end of the lever or of each lever having actuation means mounted in the carrier which can adjust the swing position of the lever.

In addition, it can be provided that one elastically deformable spring element is arranged between each lever and an opposite surface of the carrier and that each of the at least one lever is pressed against the opposite surface, through the spring element, by actuation means, preferably an eccentrically running adjusting screw.

Furthermore, it can be provided that the lever is connected with the associated actuation means through an articulated connection formed between an end surface of the actuation means and a contact surface of the lever, with this contact surface touching the end surface of the actuation means, the end surface and/or contact surface preferably being realized as a touching surface having a spherical curvature.

To prevent later deviations of an adjustment once it has been achieved, the actuation means can additionally be non-rotatably fixed.

In addition, it can simplify manufacturing if the holder and the at least one lever are formed in a single piece (integral).

The invention is especially suitable for a laser module with multiple laser units of the type in the preceding description, and for a headlight for vehicles, especially for motor vehicles, with a laser unit or a laser module such as in the preceding description.

Figure 2:
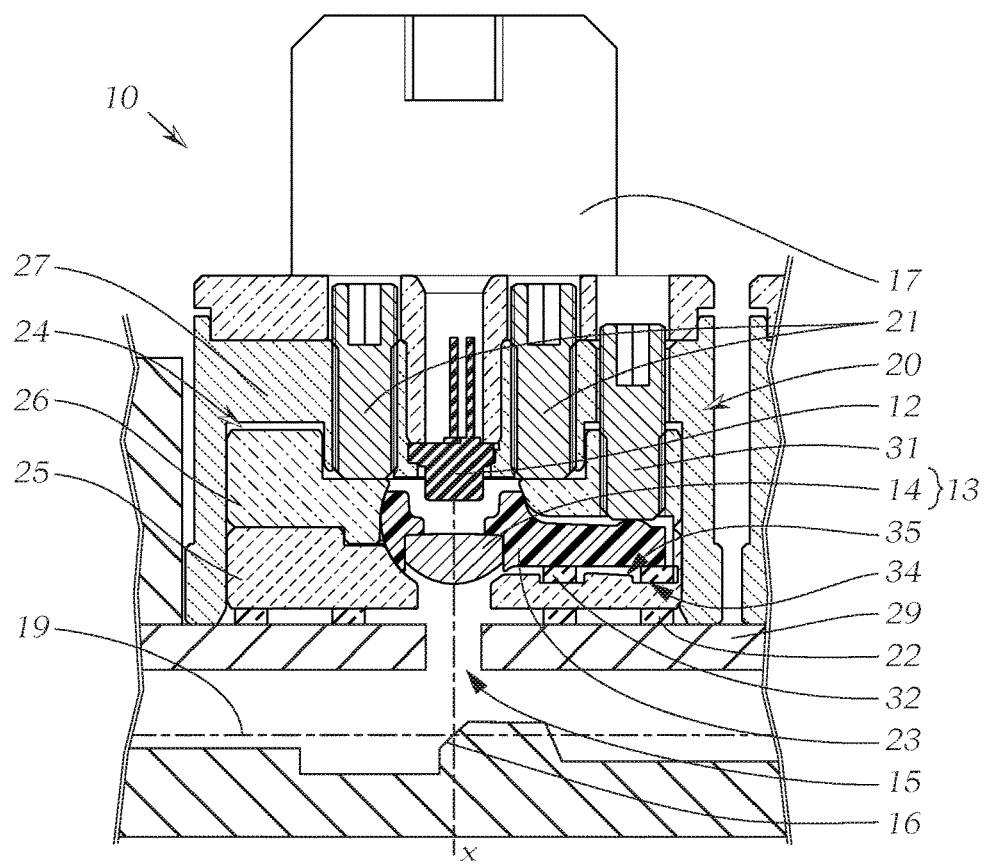
Figure 3:
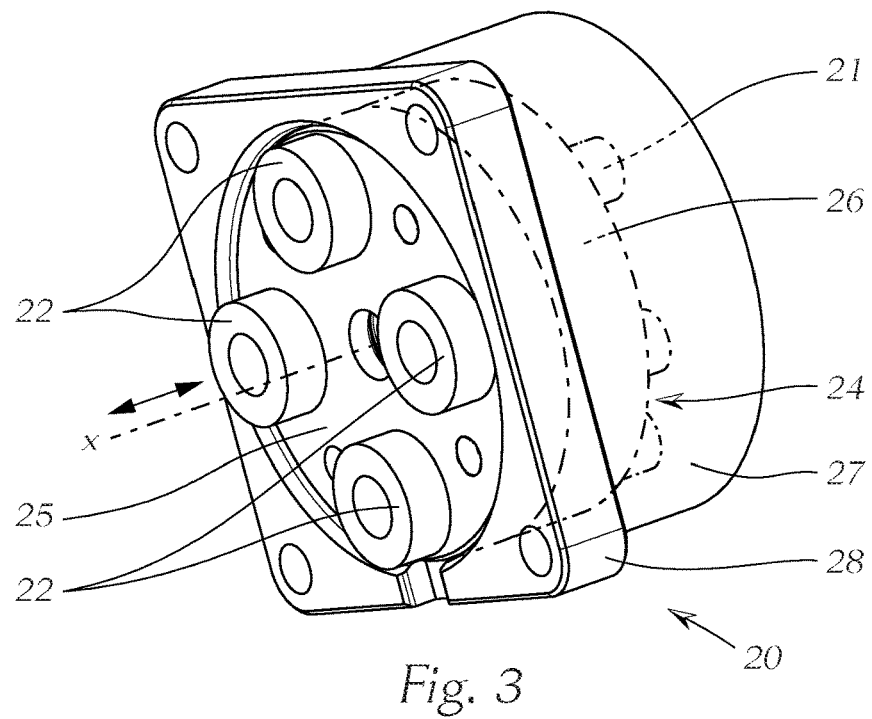
Figure 4:
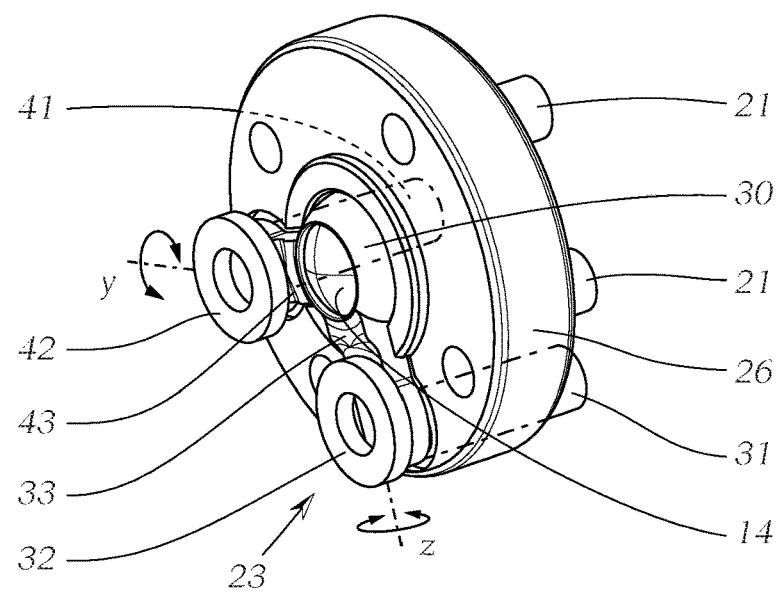
Figure 5:
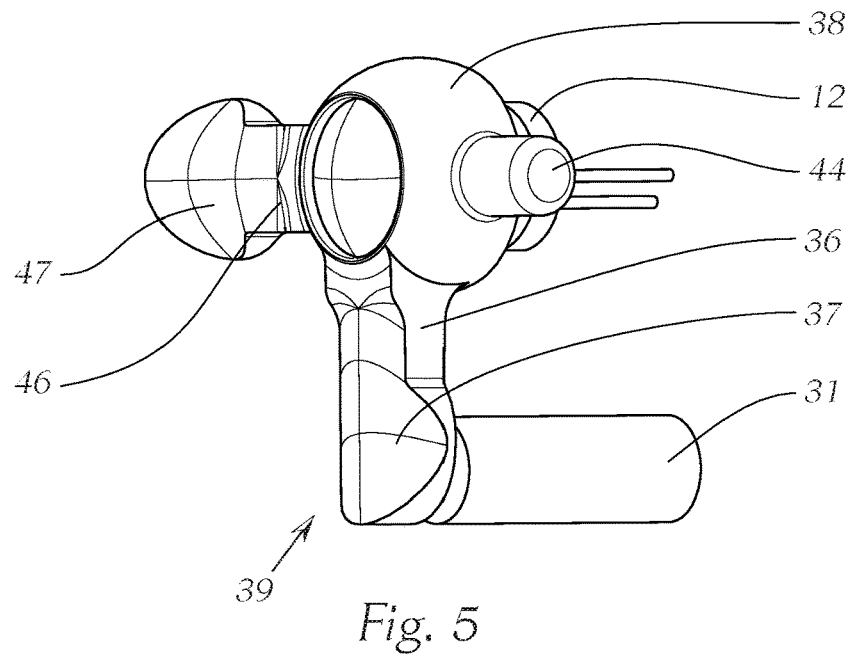

The invention along with other further developments and advantages is explained in detail below using a sample embodiment, which is shown in the drawings and relates to a laser unit with a laser diode in a laser module for a motor vehicle headlight. The drawings schematically show the following:

FIG. 1 A view of a laser unit in a laser module according to the sample embodiment, showing the outer surface of the laser unit, through which the actuation components are accessible;

FIG. 2 A sectional view of the laser unit along the cutting line A-A in FIG. 1;

FIG. 3 A perspective view of the adjusting device of the laser unit;

FIG. 4 A perspective view of the carrier in the adjusting device of FIG. 3 with a lens holder;

FIG. 5 A variant of the lens holder; and

Figure 6:
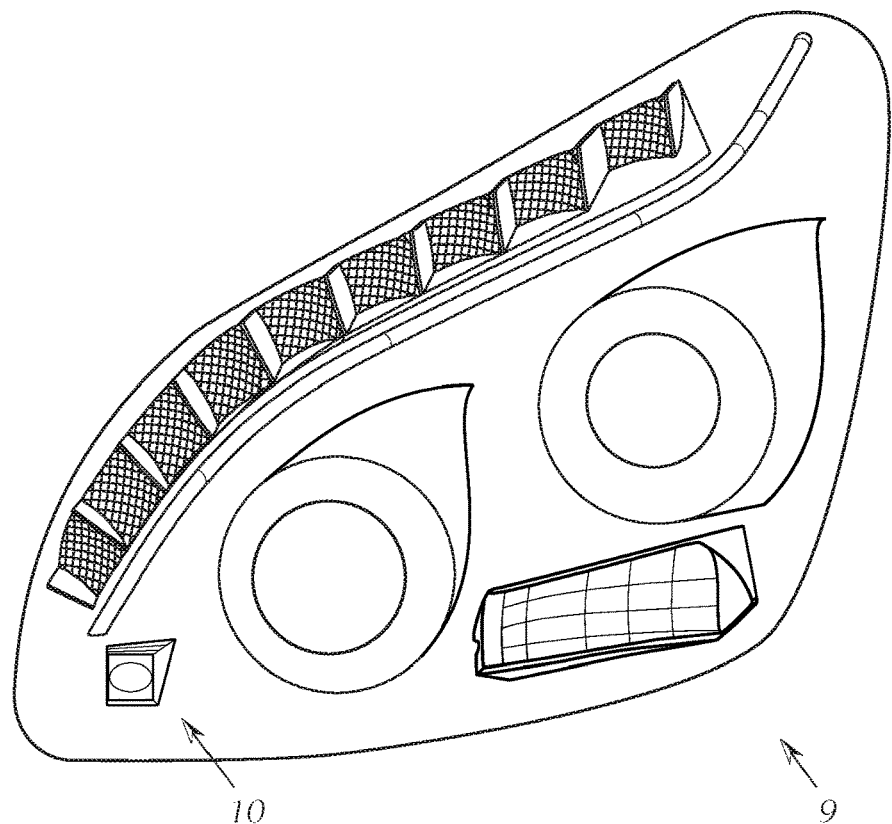

FIG. 6 A headlight with the laser module in FIG. 1.

FIGS. 1 and 2 show a laser module 10 containing one or more laser units 11, each of which has one laser light source 12, which is, in the example shown, in the form of a laser diode; however other laser sources of a type known in the art can be used in a corresponding manner. The laser units 11 are, for example, lined up next to one another in the laser module 10 along an emitted light path 19, into which the light emitted by the laser unit 11 through an emission opening 15 associated with it is coupled through a mirror 16.

The laser light source 12 has collimating optics 13 associated with it, which are, in the sample embodiment shown, realized by a single converging lens 14 (collimator lens) and are arranged directly after the light source 12 in the beam path. In the context of the invention, the beam path of the laser light source 12 to the collimating optics 13 runs in the longitudinal direction x (vertical in FIG. 2). In the sample embodiment, the emission opening 15 and the mirror 16 also lie in the (extended) longitudinal direction x.

FIG. 1 shows the outer surface of the laser unit 11. The laser diode 12 is inserted in the middle of the laser unit 11, the electrical connections of the laser diode being recognizable in the Figure. The outer surface can have one or more heat sinks 17 on it; for clarity, the cooling fins of the heat sink 17 in FIG. 1 are shown shortened. The heat sink 17 has, in addition to an opening for the already mentioned electrical connections of the laser diode 12, other openings, through which actuation components of the inventive adjusting device, namely, in the sample embodiment shown, the heads of adjusting screws 21, 31, 41, are accessible from outside. In addition, first fastening screws 45, with which the laser unit 11 is mounted in the housing of the laser module 10, and second fastening screws 18 to fasten the heat sink 17 can be seen.

FIG. 2 shows the inventive adjusting device 20 for the collimating optics 13 in a longitudinal section of the laser unit 11. In particular, the laser unit 11 comprises a lens holder 23 that holds the lens 14, and, associated with them, actuation components (adjusting screws) 21, 31, 41 and spring elements 22, 32, 42; a carrier 24 (holder receptacle) for the lens holder; and a support housing 27 with the laser light source 12 held in it. The lens holder 23 in which the collimator lens 14 is inserted is pivotably supported in the carrier 24, which in turn is supported so that it is movable in the longitudinal direction x in the support housing 27. The carrier 24 is composed of two basically disc-shaped components, namely a front part 25 and a back part 26.

FIGS. 2 and 3 show the support housing 27, which has the basic shape of a cup whose bottom (FIG. 1) is directed outward and which has a flange 28 attached to it, whose shape is, e.g., that of a rectangular cuboid (FIG. 3), preferably made in a single piece. The support housing 27 is laid on the side corresponding to the opening of the cup of a supporting surface of the housing of the laser module 10, this supporting surface being designated with reference number 29 and closing (as with a cover) the support housing 27 with the carrier 24 of the supporting surface in it. With the help of the flange 28, the support housing 29 can be fastened to the supporting surface 29, e.g., screwed on to the four ends with the help of the fastening screws 18a. The above-mentioned emission opening 15 runs through the supporting surface 29 of the laser unit 11.

The position of the carrier 24 in the x direction is adjusted by longitudinal actuation means in the support housing 27, these longitudinal actuation means being implemented, in the embodiment shown, as two adjusting screws 21. The adjusting screws 21 are arranged parallel to the longitudinal direction x and to one another with respect to the position of the laser diode 12. The heads of the adjusting screws 21 are accessible on the outer surface (FIG. 1) of the laser unit, so that here it is possible to put, e.g., hex wrenches or another suitable tool on them to adjust the adjusting screws 21 to a desired position of the longitudinal direction x. The adjusting screws 21 act on the carrier 24, or more precisely on the outer surface of the back part of the carrier 24. The carrier 24 is pressed by rubber springs 22, which are arranged between it—namely on the front face of the front part 25 (cf. FIG. 3)—and the supporting surface 29, against the adjusting screws 21. This pretensions the carrier 24 against the housing; the carrier 24 is always supported on the end surfaces of the adjusting screws 21, and play of the carrier 24 is avoided. The longitudinal adjustment according to the sample embodiment shown allows a total displacement on the order of magnitude of about ±1 mm.

FIG. 4 shows the lens holder 23 with the associated actuation means; the carrier 24 is open, namely with the front part 25 removed, so that only the back part 26 is shown.

With reference to FIGS. 2 and 4 the lens holder 23 has a central body 30, whose outer shape is that of a ring whose outside surface is shaped like a spherical zone. The collimator lens 14 is inserted into the body 30, namely in a depression of the body opposite the side through which the laser light source 12 emits the light toward the lens holder; the lens can be fixed in the depression, e.g., by cementing. The carrier 24 has a hollow spherical hollow space which holds the body 30 of the lens holder 23, so that the latter is supported in the carrier 24 the way a ball joint is.

In the back part 26, two actuation means 31, 41 are provided, each of which can horizontally swing the lens holder 23—and thus the collimator lens 14 held in it—about a spatial axis associated with each of them that runs transverse to the longitudinal direction. In the embodiment shown, each of the two actuation means is in the form of an adjusting screw 31, 41, these adjusting screws 31, 41 being arranged eccentric to the position of the collimator lens 14, parallel to the longitudinal direction. The heads of the adjusting screws 31, 41 pass through the support housing 27, and thus are accessible on the outer surface (FIG. 1) of the laser unit, so they can be adjusted to a desired position by means of suitable tools.

The adjusting screw 31 serves to adjust the swing position of the collimator lens 14 about a first transverse axis, the y-axis; the adjusting screw 41 serves to adjust the swing position of the collimator lens 14 about a second transverse axis, the z-axis.

The adjusting screw 31 acts on a lever 33, which extends transversely from the axis of light propagation from the body 30 of the lens holder 23, and presses the latter, through a rubber spring 32, against an inner opposite surface 34 (FIG. 2) in the front part 25 of the carrier 24. This rubber spring is preferably in the form of a flat rubber ring, which additionally makes it possible to form, within the rubber ring (i.e., in its inner opening), a raised stop face 35, which can preferably be sloping, to act as a parallel and thus planar stop to the end position of the lever, see FIG. 2. Here it is favorable if the end surface of the adjusting screw 31 and/or the associated contact surface of the lever 33 is convex, for example spherically convex; this produces a defined articulated connection at the place where of these two surfaces touch. The effect of the rubber spring 32 pretensions the lever against the carrier; play between the adjusting screw 31 and the lever 33 is avoided.

The adjusting screw 41 acts on a lever 43, which extends from the body 30 of the lens holder 23 in another direction than the lever 33 does; the levers 33 and 43 are preferably arranged offset by 90° to one another about the longitudinal axis. The lever 43 is pressed, through a rubber spring 42, against the inner opposite surface 34. In other respects, what was said about the lever 33 applies analogously for the lever 43.

Each axis of rotation is defined by the extension of the center of the ball joint to the point of support of the actuation means 31, 41 at the end of the respective associated lever 33, 43 of the lens holder 23. These axes of rotation correspond to the axes y and z in FIG. 4. The adjusting screws 31, 41 allow the swing position to be adjusted by a total of ±1.5°. The accuracy is, for example, 0.5° per turn, especially preferably 0.1° per turn.

FIG. 5 shows a variant of the lens holder with modified levers 36, 46 and a modified body 38 of the lens holder 39. Twisting one of the levers 36, 46 twists the respective other lever 46, 36 along with it, so they are, as shown in FIG. 5, advantageously provided with curvatures 37, 47, with which pressure is applied to the same place on the opposite surface 34 for each position. In addition, the body 38 can have a cylindrical lug 44 on it, which is correspondingly supported in the carrier (not shown). Both of the modifications shown in FIG. 5 allow more fluid swing about the two axes of the levers 36, 46.

The collimating optics 13 are adjusted as follows, for example, with the help of the inventive adjusting device 20. The laser light source 12 is activated and the light spot (laser spot) produced on the target surface (as a rule, this is the above-mentioned mirror that can be horizontally swung in a programmed manner or the conversion element serving as a phosphor) is observed or measured. The laser spot is generally located outside of the target location at the center of the target surface required for the operation, and it is additionally out of focus. First, the adjusting screws 31 and 41 are adjusted to change the position of the laser spot until it lies on the target location, which typically has a size of a few millimeters (e.g., 2-3 mm). Then, the collimating optics are displaced in the longitudinal direction x with the help of the adjusting screws 21 until the laser spot is focused on the associated target surface, as required. For adjustment, it is possible to use, for example, a gauge, which comprises a sensor that is arranged so that it corresponds to the target location and provides such a feedback value for the previously described adjustment. During assembly, the optical element provided for the target location is then positioned.

If desired, after the collimating optics or lens 13, 14 are adjusted, the adjustment means 21, 31, 41 can be permanently fixed in the adjusted position. This can be done, for example, by clamping the screw head or by applying a hardening adhesive around the screw head.

The laser module 10 with the so adjusted collimating optics 13 can then be inserted at the position provided for it in a headlight 9, a partly cut open view of which is shown in FIG. 6.

It should be emphasized that the sample embodiment is for the purpose of illustration, and should not be interpreted as restrictive. For example, instead of the adjusting screws it is possible to provide other suitable devices for mechanical or electromechanical adjustment by hand and/or by actuator motors. In one variant in which it is sufficient for the lens to pivot about only one axis, it is also possible to use a pivot instead of a design like a ball joint. It is also possible for the collimating optics, which in the sample embodiment shown above are realized by a (single) lens, to be implemented in other embodiments of the invention with the help of multiple lenses, one or more mirrors, or a combination of such optical components. Furthermore, the spring elements can be implemented in the form of rubber springs or other elastic components such as, e.g., spiral or leaf springs. In general, numerous modifications and further developments are possible in the framework of the invention, which the person skilled in the art can easily discover.

The invention claimed is:

1. A laser unit (11) for a vehicle headlight comprising:
   a laser light source (12),
   a support housing (27) in which the laser light source is supported, and
   adjustable collimating optics (13) for laser light emitted by the laser light source, the adjustable collimating optics comprising at least one optical component (14) that is arranged at a distance, in a longitudinal direction (x), from the laser light source,
   wherein an adjusting device (20) is associated with the adjustable collimating optics (13), said adjusting device having a carrier (24) adjustable relative to the laser light source (12) in the longitudinal direction (x), the at least one optical component (14) within the carrier (24) being pivotable about at least one spatial axis (y, z) running transverse to the longitudinal direction,
   wherein the carrier (24) is adjustable in the longitudinal direction in the support housing (27) and the laser light source (12) is fixed in position in the support housing (27).

2. The laser unit of claim 1, wherein a longitudinal actuation device (21) is provided in the support housing (27) and is adjustable in the longitudinal direction, the carrier (24) being supported against the longitudinal actuation device (21).

3. The laser unit of claim 2, wherein the longitudinal actuation device (21) comprises a number of adjusting screws running parallel to the longitudinal direction (x).

4. The laser unit of claim 2, wherein the longitudinal actuation device (21) is configured to be fixed in its longitudinal position.

5. The laser unit of claim 2, wherein at least one elastically deformable spring element (22) is provided in the support housing (27), and presses the carrier (24) against the at least one longitudinal actuation device (21).

6. The laser unit of claim 1, wherein the at least one optical component (14) is pivotable about two spatial axes (y, z), said spatial axes being perpendicular to one another and being perpendicular to the longitudinal direction (x).

7. The laser unit of claim 1, wherein the carrier (24) comprises a holder (23) in which the optical element (14) is held, and at least two levers (33, 43) are provided that act upon the holder, an outer end of each lever (33, 43) having actuation means (41, 31) mounted in the carrier (24) which is configured to adjust the swing position of the lever.

8. The laser unit of claim 7, wherein one elastically deformable spring element (32, 42) is arranged between each lever of the at least two levers (33, 43) and an opposite surface (34) of the carrier (24) and wherein each lever of the at least two levers (33, 43) is pressed against the opposite surface (34), through the elastically deformable spring element (32, 42), by actuation means (31, 41).

9. The laser unit of claim 7, wherein the at least two levers (33, 43) are connected with the associated actuation means (31, 41) through an articulated connection formed between an end surface of the actuation means and a contact surface of the at least two levers, said contact surface touching said end surface of the actuation means, the end surface and/or contact surface being a touching surface curved spherically.

10. The laser unit of claim 7, wherein the actuation means (31, 41) is configured to be non-rotatably fixed.

11. The laser unit of claim 7, wherein the holder (23) and the at least two levers (33, 43) are integral.

12. A laser module (10) comprising two or more laser units of claim 1.

13. A vehicle headlight (9) comprising one or more laser units of claim 1.

14. The laser unit of claim 1, wherein the carrier (24) comprises a holder (23) in which the optical element (14) is held, and wherein at least one lever (33, 43) is provided that acts upon the holder, an outer end of the at least one lever (33, 43) comprising actuation means (41, 31) mounted in the carrier (24) which is configured to adjust the swing position of the at least one lever.

15. The laser unit of claim 8, wherein the actuation means (31, 41) comprises an eccentrically running adjusting screw.

16. The laser unit of claim 1, wherein the laser light source comprises a laser diode.

17. A laser unit (11) for a vehicle headlight comprising:
a laser light source (12),
a support housing (27) in which the laser light source is supported, and
adjustable collimating optics (13) for laser light emitted by the laser light source, the adjustable collimating optics comprising at least one optical component (14) that is arranged at a distance, in a longitudinal direction (x), from the laser light source,
wherein an adjusting device (20) is associated with the adjustable collimating optics (13), said adjusting device having a carrier (24) adjustable relative to the laser light source (12) in the longitudinal direction (x), the at least one optical component (14) within the carrier (24) being pivotable about at least one spatial axis (y, z) running transverse to the longitudinal direction,
wherein the carrier (24) comprises a holder (23) in which the optical element (14) is held, and at least two levers (33, 43) are provided that act upon the holder, an outer end of each lever (33, 43) having actuation means (41, 31) mounted in the carrier (24) which are configured to adjust the swing position of the lever, and
wherein one elastically deformable spring element (32, 42) is arranged between each lever of the at least two levers (33, 43) and an opposite surface (34) of the carrier (24) and wherein each lever of the at least two levers (33, 43) is pressed against the opposite surface (34), through the elastically deformable spring element (32, 42), by actuation means (31, 41).

* * * * *